July 19, 1955     G. A. LYON     2,713,513
WHEEL COVER
Filed Oct. 2, 1952     2 Sheets-Sheet 1
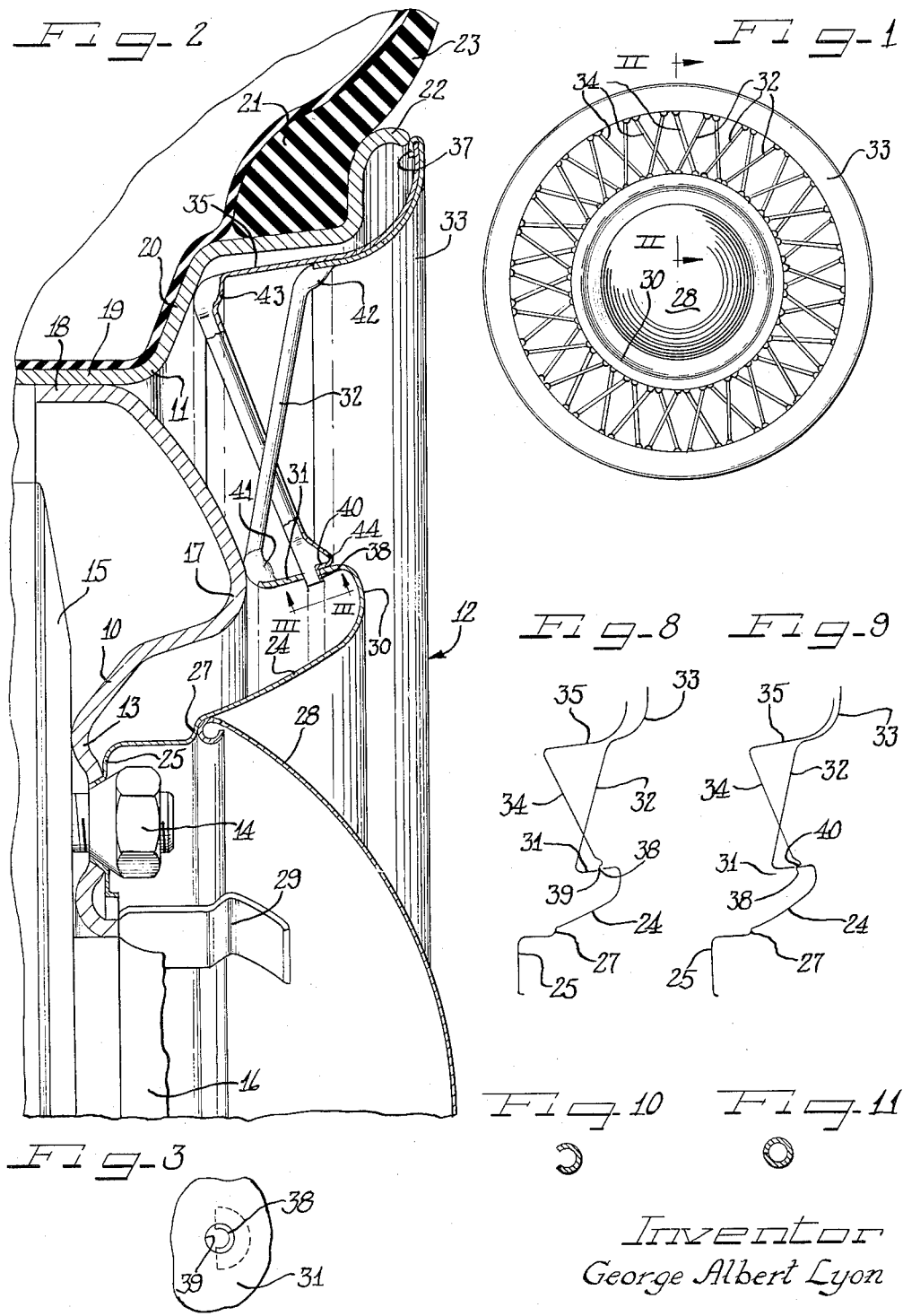
Inventor
George Albert Lyon
by Hill, Sherman, Meroni, Gross & Simpson Attys

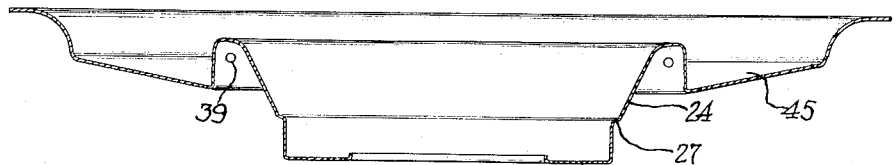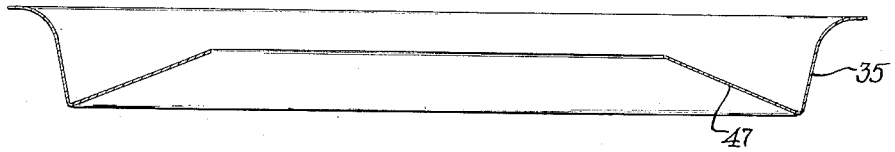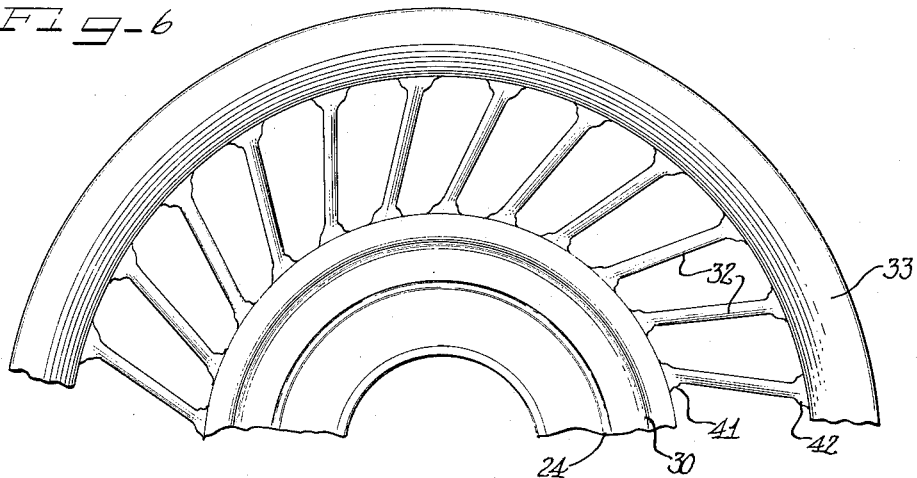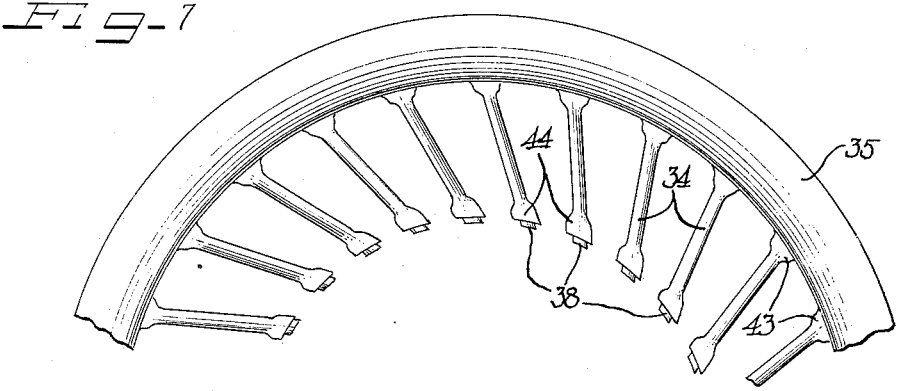

United States Patent Office 2,713,513
Patented July 19, 1955

2,713,513

WHEEL COVER

George Albert Lyon, Detroit, Mich.

Application October 2, 1952, Serial No. 312,796

8 Claims. (Cl. 301—37)

The present invention relates to improvements in wheel structures and more particularly concerns the ornamental and protective covering of the outer side of vehicle wheels.

An object of the present invention is to provide a vehicle wheel structure of the conventional disk spider type having novel means thereon to afford the illusion that the wheel is of the wire spoke type.

Another object of the invention is to provide a novel wheel cover simulating a wire spoke wheel structure.

A further object of the invention is to provide a wheel cover having novel means strongly simulative of wire wheel spoke structure.

Other objects, features and advantages of the present invention will be readily apparent from the following detailed description of a preferred embodiment thereof taken in conjunction with the accompanying drawings, in which:

Figure 1 is a side elevational view of a vehicle wheel cover structure embodying the features of the invention;

Figure 2 is an enlarged radial sectional view taken substantially on the line II—II of Figure 1, and showing the cover applied to the outer side of a vehicle wheel;

Figure 3 is a fragmentary elevational detail view of that portion of the cover in Figure 2 indicated by the arrows III—III;

Figure 4 is a diametrical sectional view through a partially completed cover member comprising a component of the finished cover;

Figure 5 is a diametrical sectional view through a partically completed second component of the cover;

Figure 6 is a fragmentary elevational view of the cover component of Figure 4, following a further step in the process of making the cover;

Figure 7 is an elevational view of the cover component of Figure 5 following a further step in the method of making the cover;

Figure 8 is a schematic radial sectional view through the spoke-carrying cover components illustrating a preliminary step in effecting assembly of the cover;

Figure 9 is a similar schematic sectional view through the cover showing the spoke-carrying components in a further stage of assembly;

Figure 10 is a sectional view through a modified form of the spoke; and

Figure 11 is a sectional view through a further modified form of the spoke structure.

As shown on the drawings:

The invention is especially applicable to a wheel such as may be used on an automobile, or a delivery truck or the like, and comprising a wheel body 10 and a tire rim 11. Applied to the outer side of the wheel in ornamental, protective relation is a wheel cover 12.

The wheel body 10 may be of the more or less conventional disk spider type stamped from suitable heavy gauge sheet metal. Centrally the wheel body has a dished bolt-on flange 13 which is secured as by means of bolts 14 to a vehicle axle part such as a flange or brake drum housing 15 from which projects centrally the customary axle hub structure 16 to clear which the bolt-on flange 13 has a central aperture. Intermediately the wheel body 10 is provided with an annular axially outwardly projecting reinforcing nose bulge 17 while peripherally the wheel body is provided with an attachment flange 18 by which the wheel body is suitably secured to a base flange 19 of the tire rim.

The tire rim 11 may be rolled from suitable gauge sheet metal and comprises a side flange 20 extending generally radially outwardly from a base flange 19 and merging with an intermediate generally axially outwardly sloping flange 21 which merges with a terminal flange 22. The configuration of the tire rim 11 is of the multi-flange drop-center type adapted to support a pneumatic tire and tube assembly 23.

In the present instance the cover 12 is of multi-component structure including as a principal component a circular cover member 24 which is adapted to be secured to the bolt-on flange 13 of the wheel body. To this end, the cover member 24 comprises a circular body portion that is generally simulative of the nose bulge 17 of the wheel body and is centrally dished to provide a bolt-on flange 25 having bolt apertures registering with the corresponding apertures in the bolt-on flange 13. Thereby the flange 25 of the cover member can be secured to the wheel by means of the attachment bolts 14.

Spaced axially outwardly from the bolt-on flange 25, on an intermediate portion of the body of the cover member 24 is an offset providing a generally axially outwardly facing shoulder 27 affording a seat for the beaded edge of a hub cap 28. The hub cap is adapted to close the central opening in the cover and is held to the seat 27 by means of retaining clips 29 carried by the bolt-on flange 13 of the wheel body.

The body of the cover member 24 has a generally axially outwardly projecting annular hump or rib-like projection 30 adapted in assembly to overlie the nose bulge 17 of the wheel. At the radially outer side of the rib 30 is provided a generally axially inwardly and slightly radially inwardly slanting flange 31 which extends substantially to the nose bulge 17 in the assembly of the cover with the wheel. Projecting generally radially outwardly and slanting slightly axially outwardly from the inner margin of the flange 31 is a series of spoke elements 32. At their outer ends the spoke elements 32 join an annulus 33 in the nature of a trim ring adapted to overlie the outer side of the tire rim and more especially the terminal flange 22. As will be observed in Figure 2, the outer annulus portion 33 is of generally concave convex shape extending from the terminal edge of the rim flange 22 generally radially axially inwardly to a position of the inner margin of the annulus opposite the outer margin of the intermediate flange 21. It is to the inner margin of the annulus 33 that the spokes 32 are joined.

As will be observed in Figure 1, the spokes 32 are angled in torsional direction from the radial, in the present instance clockwise as viewed.

Cooperatively related to the spokes 32 and in crossing relation thereto, is a complementary series of spokes 34 extending from a flange member 35 and connected to the cover member 24. To this end, the flange member 35 is of generally complementary shape to the outer trim ring annulus 33 and is nested therebehind, having an outer margin secured firmly in place by an underturned reinforcing and clamping flange 37 at the outer margin of the member 33. The inner portion of the flange member 35 extends substantially axially inwardly beyond the edge of the member 33 and has the spokes 34 joined integrally in one piece herewith and sloping generally radially inwardly and axially outwardly and slanted from the radial so that the spokes extend in a torsional direction crossing the spokes 32 and generally counterclockwise, as best seen in Fig. 1.

At their inner ends, the spokes 34 have terminal lugs 38, as best seen in Figs. 2 and 3, which are preferably semi-cylindrical in form and extend into complementary respective apertures 39 in the flange 31 of the cover member 24 provided intermediate the inner and outer margins of the flange 31, that is spaced axially inwardly from the cover body rib 30. Adjacent to the end lugs 38, the spokes are provided with respective abutment shoulders 40 that engage against the flange 31 to limit inward projection of the spoke terminals into the apertures 39.

The completed cover strongly simulates a wire wheel type of wheel but actually can be finished more attractively by reason of the ability to make the cover from thin sheet metal such as stainless steel or brass which can be polished or plated and polished to a lustrous finish, or can be plated and painted as desired to provide the particular ornamental or simulative effect desired. Thus a substantially conventional wheel can be covered to make it appear to be a wire spoke type of wheel, such as is popular with at least certain sport car enthusiasts.

In order to complete the illusion of wire spokes, the spokes 32 have end enlargements 41 and 42 at respectively their inner and outer ends, and the spokes 34 have end enlargements 43 and 44 at respectively their outer and inner end portions. Such enlargements are constructed to simulate the customary attachment bosses of wire wheel spokes.

By preference, the cover members 24 and 35 are individually made from separate sheet metal blanks as shown in respectively Figures 4 and 5. The blanks are first drawn to the finished general shape of the cover members, as depicted. The cover member 24 when fully drawn has an intermediate generally radially inwardly and axially inwardly sloping portion 45 in which, following plating and polishing of the partially formed cover member, the spokes 32 are formed by trimming away uniform areas of the cover portion 45 intermediate the spokes, and then forming the spokes to hollow or tubular, preferably cylindrical or semi-cylindrical cross-section, as best seen in Fig. 6.

The cover member 35, as fully drawn is provided with a generally radially inwardly and axially outwardly slanting, substantially frusto-conical inner flange portion 47. After plating and polishing, or burnishing of the cover member 35, the inner flange portion 47 is trimmed out at uniform intervals to leave material for the spokes 34, and the spokes are then formed up into preferably cylindrical or semi-cylindrical, hollow, tubular shape for rigidity and to simulate wire spokes of a wheel, as best seen in Fig. 7.

It may be noted that the hub cap member 28 may be formed from the material stamped out of the center portion of the blank from which the cover member 35 is made.

A preferred mode of assembly of the cover components 24 and 35 is depicted in Figures 8 and 9. As shown in Figure 8, the members 24 and 35 are first preliminarily brought together with the spokes 32 and 34 in crossing relation and with the spoke terminals 28 in general registration with the apertures 39. Initially, however, the spokes 34 are at a somewhat greater axially outward angle so that they lie at their tips on a somewhat larger diameter than in the ultimate or final assembly so that the tips will clear the axial margin of the flange 31. Then by bringing the cover components closer together in axial relative directions, the terminals 38 will be brought opposite the apertures 39 to snap thereinto. Continued relative assembly movement of the cover components results in the condition depicted in Figure 9 wherein it will be observed that the terminals 38 of the spokes 34 are fully within the apertures 39 and the spokes 34 have straightened out somewhat, that is the tips of the spokes have been moved by flexing of the spokes, to a smaller diameter.

As a final step in the assembly, the member 35 is brought into fully nested relation to the trim ring annulus portion 33 of the inner cover member and the outer margin of the portion 33 is turned upon itself to provide the clamping flange 37 which holds the member 35 firmly nested in the back of the portion 33. As a result, the spokes 34 are tensioned and the spokes 32 are similarly tensioned by the interaction of the parts. This comes about by virtue of the fact that as the member 35 is drawn into the final assembly with the portion 33, the spokes 34 tend to straighten out and thrust the shoulders 40 thereof hard against the flange 31, tending to stress the flange 31, while at the same time, the portion 33 of the cover is drawn toward the cover flange member 35, thus placing the spokes 32 under tension. The finished product is a tight, substantially rigid assembly.

A certain amount of flexibility is present in the body portion of the cover member 24 so that when the bolt-on flange 25 is tightened down, the member 24 is placed under a certain amount of stress by virtue of the inner end portions of the spokes 32 shouldering against the nose bulge 17. By preference the outer end portions of the spokes 34 shoulder against the tire rim side flange 20, under a certain amount of tension. This assures that the cover will be rattle-free on the wheel. As shown, the underturned outer marginal flange 37 may also engage the extremity of the terminal flange 22.

While Figure 3 shows a preferred form of the spoke which is semi-cylindrical, that is generally channel shaped and open to the back, Figure 10 shows a modification wherein the cross-section of the spoke is approximately three-quarters cylindrical. In Figure 11 is shown a further modification wherein the spoke is substantially full cylindrical. It will be appreciated, of course, that although the spokes have been shown of generally cylindrical or partially cylindrical form, they could take other cross-sectional shapes as preferred such as angular or other geometrical cross-sectional shapes. However, for most practical purposes the generally cylindrical outer surface is preferred.

Cross reference is made to my copending application Serial No. 321,095 filed November 18, 1952 for claims directed to the method which is disclosed but not claimed herein.

It will be understood that modifications and variations may be effected without departing from the scope of the novel concepts of the present invention.

I claim as my invention:

1. In a wheel structure comprising a disk spider wheel body and a tire rim carried thereby, a cover for the outer side of the wheel comprising a member having a central flange structure attachable to the wheel body, a series of generally radially outwardly angled spokes projecting from said member and having end portions at juncture with the member bearing against the wheel body, and a cover portion attached to the outer end portions of said spokes carrying additional spokes directed inwardly cooperative to the first mentioned spokes and having outer end portions bearing against the tire rim.

2. In a cover for disposition at the outer side of a vehicle wheel, a pair of cover members, one of said cover members having an inner portion and an outer portion and a series of spokes connecting said portions, and the other cover member secured to said outer portion and having a series of spokes cooperating with said first series of spokes and connected to said inner portion.

3. In a cover for disposition at the outer side of a vehicle wheel, a cover member having inner and outer portions and connecting spokes between said portions, and a second cover member internested with the outer of said portions and having a series of spokes cooperatively related to said connecting spokes and secured to the inner portion.

4. In a cover for disposition at the outer side of a vehicle wheel, a circular cover member adapted to overlie a wheel body and having central means for attachment to the wheel body, said cover member having a generally axially extending radially outer flange, said flange having extending from the inner margin thereof a series of generally radially outwardly directed spokes, the outer end portions of said spokes having the ends thereof connected to an annulus, a second annulus connected to said first mentioned annulus and having complementary spokes directed generally radially inwardly and having the ends thereof attached to said flange.

5. In a cover for disposition at the outer side of a vehicle wheel of the disk spider type to afford the illusion that the wheel is a wire spoke-type wheel, a central cover member having a generally axially extending flange with spokes directed generally radially outwardly from a margin of the flange and connected integrally in one piece by an outer trim ring annulus, and a second cover member attached to said annulus and having a generally axially extending flange with a margin thereof spaced from said annulus and said margin having a series of spokes projecting therefrom generally radially inwardly toward and into engagement with said inner cover member.

6. In a cover for disposition at the outer side of a vehicle wheel of the disk spider type to afford the illusion that the wheel is a wire spoke-type wheel, a central cover member having a gnerally axially extending flange with spokes directed generally radially outwardly from a margin of the flange and connected integrally in one piece by an outer trim ring annulus, and a second cover member attached to said annulus and having a generally axially extending flange with a margin thereof spaced from said annulus and said margin having a series of spokes projecting therefrom generally radially inwardly toward and into engagement with said inner cover member, said spokes being maintained under tension in the assembly.

7. In a wheel cover for disposition at the outer side of a vehicle wheel, a drawn sheet metal cover blank providing a central cover portion with a series of apertures therein and an outer cover portion connected by an annular intermediate area having a uniform series of elongated apertures cut therein connecting the portions by spoke-like remaining parts of said intermediate area, and a second sheet metal cover member provided with an annular portion and a flange portion cut out at uniform intervals complementary to the cut out portions of said intermediate area to provide a series of complementary spokes, the ends of the last mentioned spokes being registered in said apertures in said central portion and flexed and somewhat straightened from the initial formation thereof to lock said ends in said apertures, said outer cover portion and said annular cover portion being permanently secured together.

8. In combination in a cover for disposition at the outer side of a vehicle wheel, a cover member having a central portion providing a generally radially outwardly facing annular surface having therein a series of annularly aligned apertures, said cover member having an annular marginal portion spaced from said central portion and connected thereto by a series of spaced spoke elements angled in one peripheral direction, an annular cover member internested with said annular marginal cover portion and having a flange body portion extending generally axially inwardly behind the first cover member, said body flange portion having an inner extremely provided with a series of spoke-like extensions generally matching the spoke-like elements of the outer cover member and extending through the spaces between said spoke-like elements and having terminals engaged retainingly in said apertures.

References Cited in the file of this patent

UNITED STATES PATENTS

| D. 166,863 | McLeod | May 27, 1952 |
| 2,183,220 | Horn | Dec. 12, 1939 |
| 2,460,784 | Lyon | Feb. 11, 1949 |

FOREIGN PATENTS

| 714,587 | France | Sept. 7, 1931 |